Oct. 20, 1959

J. A. PRATT 2,909,652

SPOTLIGHT PROJECTOR

Filed Aug. 1, 1958

INVENTOR.
JAMES A. PRATT

BY

ATTORNEYS

Oct. 20, 1959     J. A. PRATT     2,909,652
SPOTLIGHT PROJECTOR
Filed Aug. 1, 1958     4 Sheets-Sheet 2
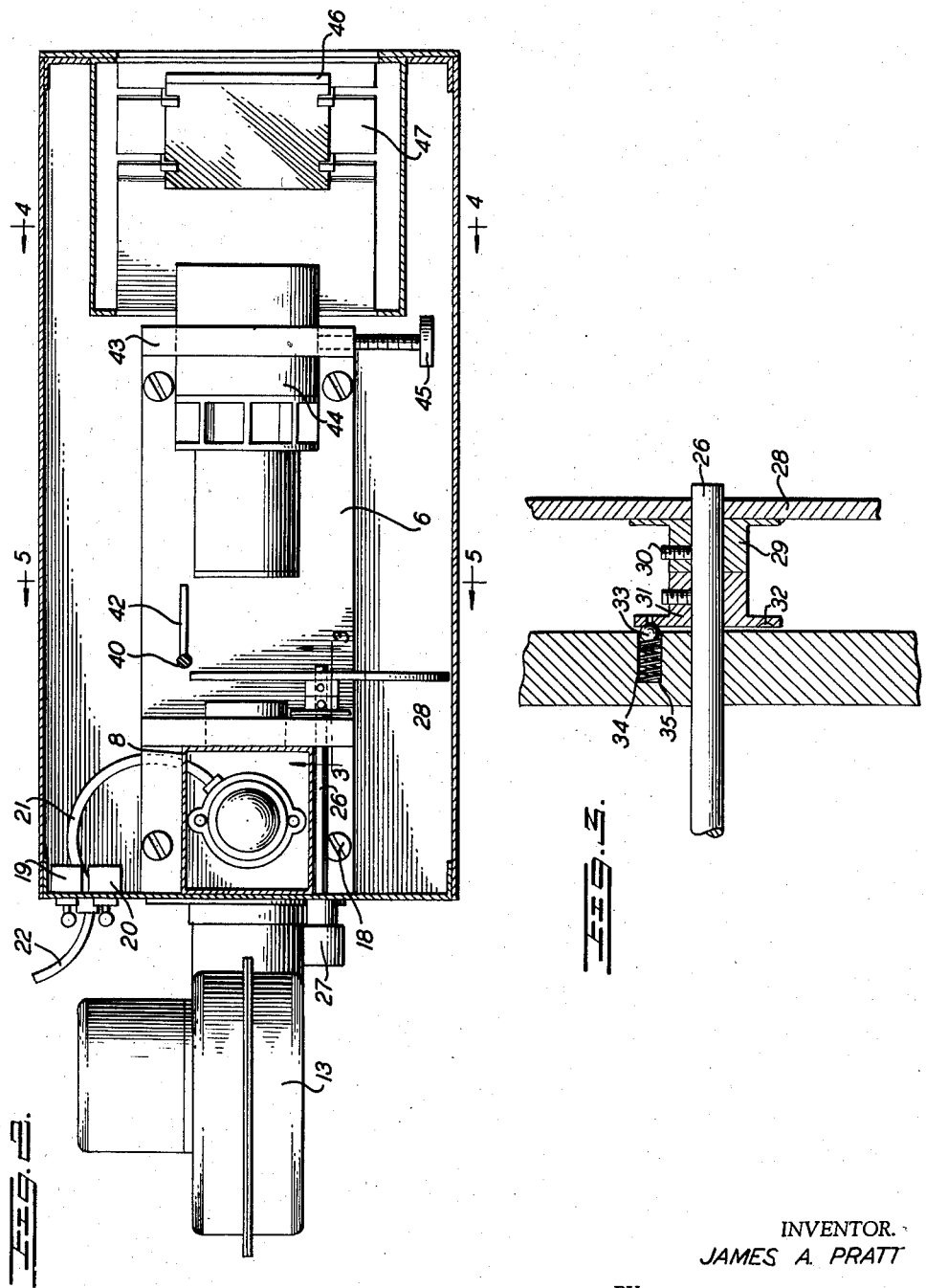
INVENTOR.
JAMES A. PRATT
BY
ATTORNEYS Oct. 20, 1959
J. A. PRATT
2,909,652
SPOTLIGHT PROJECTOR
Filed Aug. 1, 1958
4 Sheets-Sheet 3
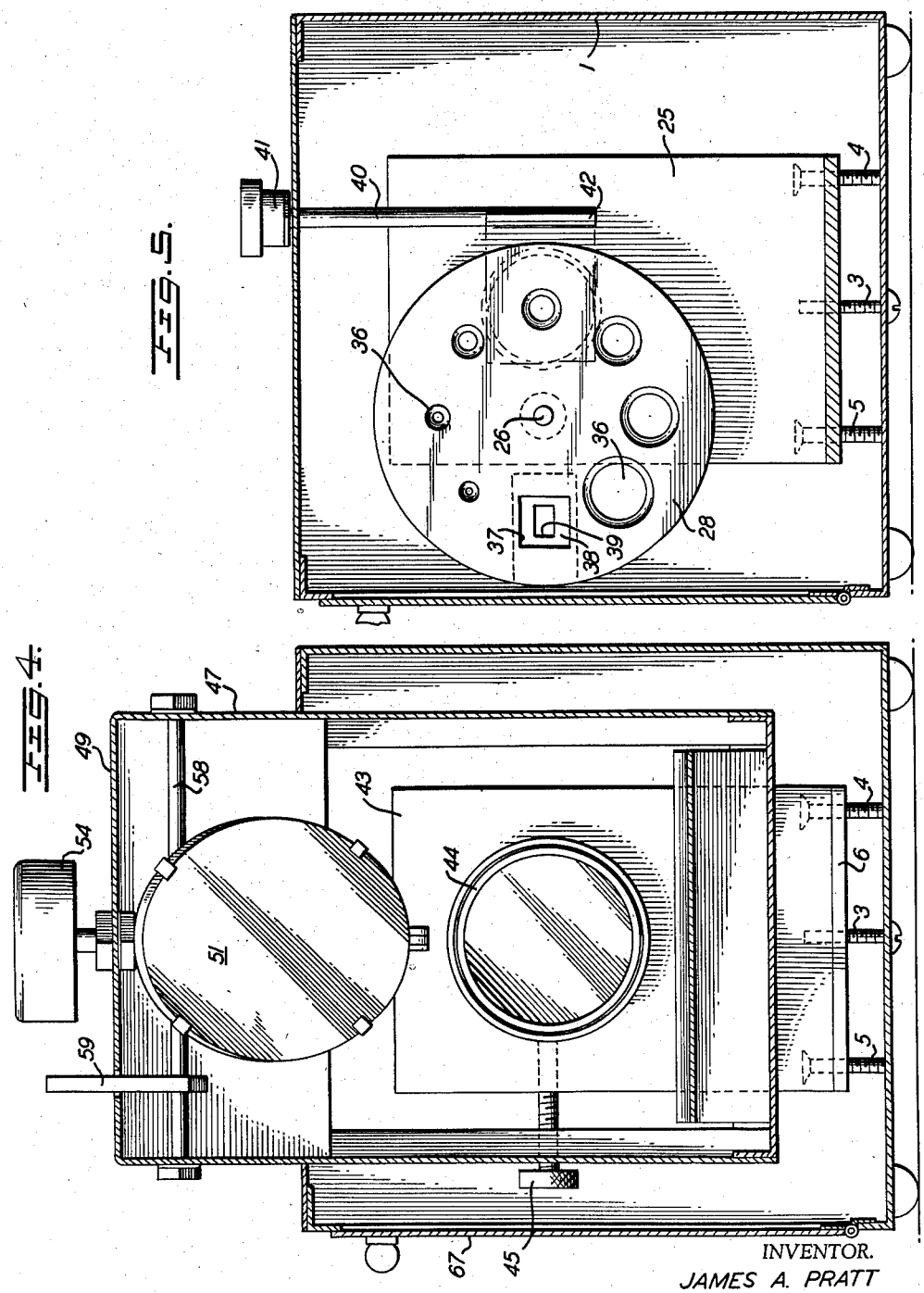
INVENTOR.
JAMES A. PRATT
BY
ATTORNEYS

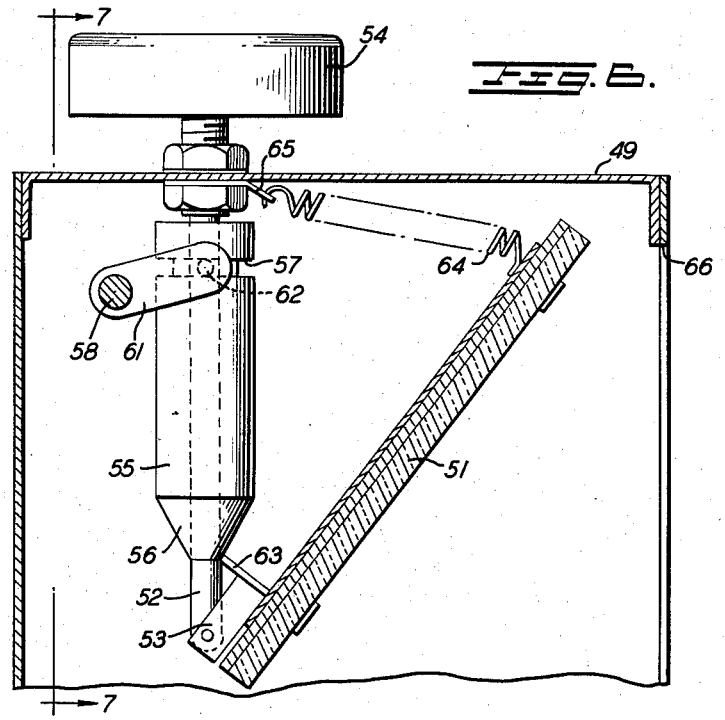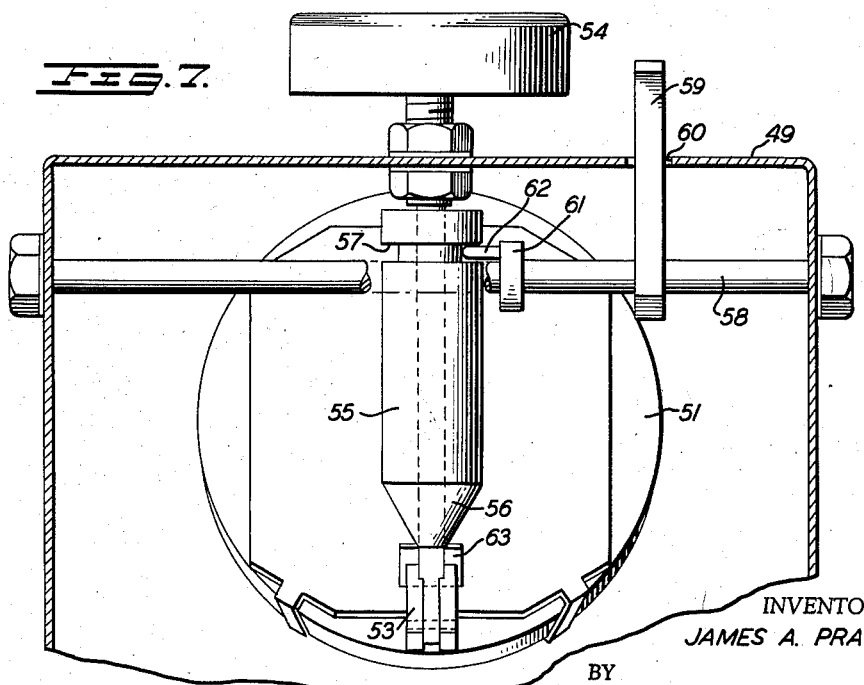

2,909,652
Patented Oct. 20, 1959

United States Patent Office

2,909,652
SPOTLIGHT PROJECTOR

James A. Pratt, Washington, D.C.

Application August 1, 1958, Serial No. 752,487

5 Claims. (Cl. 240—3)

This invention relates generally to spotlight apparatus and more specifically to compact, portable spotlight projectors with relatively low manufacturing cost features and high quality light beam handling characteristics for use in schools and auditoriums.

The primary object of this invention is to provide an improved portable spotlight projector.

A specific object of this invention is to provide a portable spotlight projector with improved focusing, light directing, and light beam shaping features.

A further object of this invention is to provide a portable spotlight projector with a light beam stop to permit quick cutoffs of the projected light beam without requiring the lamp to be extinguished.

With the foregoing and other objects in view, the invention resides in the following specification and appended claims, certain embodiments and details of construction of which are illustrated in the accompanying drawings, in which:

Figure 2 is a partially sectioned plan view of the projector with the cover and the adjustable light directing reflector removed;

Figure 3 is an enlarged sectioned view of the indexing unit for the light contouring disk and is taken along the lines 3—3 of Figure 2;

Figure 4 is a partially sectioned view in front elevation taken along the lines 4—4 of Figure 2;

Figure 5 is a partially sectioned view taken along the lines 5—5 of Figure 2;

Figure 6 is an enlarged, partially sectioned view of the portion of the projector including the adjustable light directing reflector; and Figure 7 is a further view of the mechanism of Figure 6 taken along the lines 7—7 of Figure 6.

Figure 1:
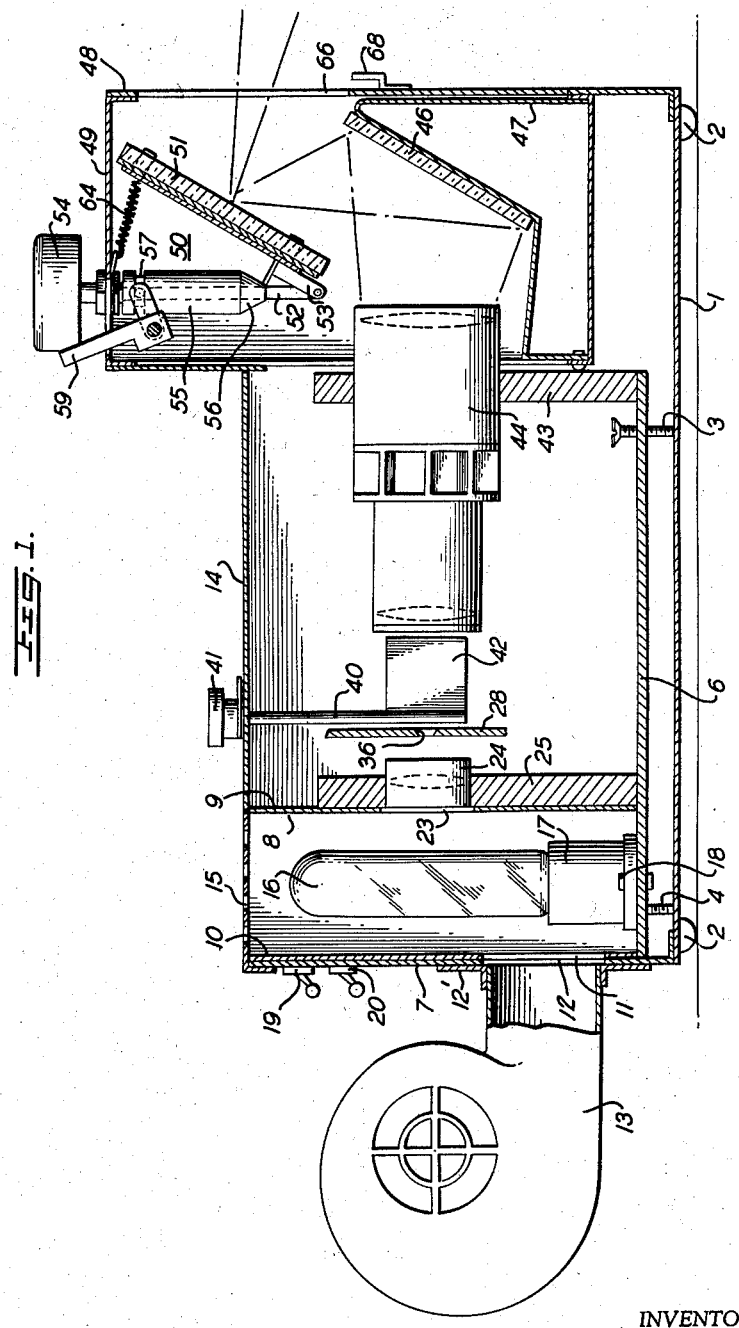
Figure 1 is a partially sectioned view in side elevation of the projector comprising the invention.

Referring now more particularly to the drawings, the projector is illustrated as having a casing 1 with supporting buttons or feet 2. Mounted by standoff screws 3, 4 and 5 with the casing is a spaced plate 6. Mounted on the end of plate 6 adjacent the end wall 7 of casing 1 is a lamp compartment 8 having a front wall 9 and a rear wall 10. The rear wall 10 is provided with an opening 11 adjacent to the plate 6. The opening 11 is in registration with an opening 12 in end wall 7 of casing 1. Secured to the wall 7 by a bracket 12¹ and welding or other suitable means is a blower 13 for directing air into the compartment 8.

The top wall 14 of casing 1 is provided with a plurality of openings 15 above the compartment 8 to constitute an exhaust for the air derived from the blower. A projection lamp 16 is mounted in a socket 17 which is secured within compartment 8 to plate 6 as by screws 18. The socket 17 is electrically connected to switches 19 and 20 for controlling the lamp and blower by a line 21. Power is derived for the system from a usual A.C. source, not shown, through a line 22 connected with switches 19 and 20. Blower 13 is connected to switches 19 and 20 by means not shown.

Front wall 9 of compartment 8 is provided with an opening 23 to emit light forwardly of the projector. A light directing and concentrating lens 24 is supported by a member 25 carried by plate 6 in direct registration with opening 23. Also carried by member 25 is a rotatable shaft 26 which extends rearwardly of the projector through rear wall 10 and terminates in a knob 27. A hub 29 is mounted on the forward end of shaft 26 and is fixed thereto by a set screw 30. Secured to the hub 29 by any suitable means such as welding is a disk 28. Adjacent hub 29 is an indexing bushing 31 having recesses 32 (Fig. 3) to receive an indexing ball 33 under the pressure of a spring 34 carried in recess 35 of member 25. Upon rotary movement of knob 27 the shaft 26 is movable between a plurality of indexed positions as determined by the amount of recesses 32 in the bushing 31.

The disk 28 is provided with a plurality of openings 36 which are radially spaced from shaft 26 adjacent to the periphery so that as each such opening registers with the lens 24 it will be fixed in the set position by the indexing means described above. The openings 36 control the size and contour of the beam of light emitted by the lens 24. As viewed in Figure 5 most of the openings are circular in form with only opening 37 being illustrated as substantially square. Opening 37 represents a selective sizing or contouring opening wherein a removable slide 38 having a particular opening 39, shown as a small rectangle, may be inserted. Any contour may be used for the disk openings or the removable slide opening.

Secured to the casing 1 for free rotation relative thereto is a shaft 40 provided with an operating knob 41 on the exterior of the casing. A plate 42 is secured to the end of shaft 40 within the casing 1. Rotation of knob 41 will move plate 42 from a position parallel to the light beam (Fig. 1) to a position transverse thereto as illustrated in dotted lines in Figure 5. The plate 42 in this latter position intercepts the light beam emerging from a sizing opening 36 in disk 28 and acts as a quick light stop to permit the removal of a directed spot beam from an object without necessitating the extinguishing of the lamp 16.

Secured to the forward end of plate 6 by any suitable means is a supporting member 43 for a focusing lens assembly 44. Lens assembly 44 may be adjusted in position relative to member 43 to adjust the focus of the light beam by release of the set screw 45 and manual pressure to move said assembly rearwardly or forwardly of the projector.

A light beam directed forwardly by lens assembly 44 impinges upon a stationary, angularly mounted reflector 46 carried by a supporting frame 47 within the raised front end portion 48 of casing 1. The frame 47 on its upper wall 49 carries a universally mounted reflector assembly, generally indicated at 50. The mechanism of this reflector assembly is somewhat similar to that illustrated in the invention in prior United States Letters Patent No. 2,705,278. In the present design the upper reflector 51 is pivotally mounted on the end of control shaft 52 by a pivot assembly 53. Shaft 52 is mounted on the wall 49 of the frame and may be oscillated by a knob 54. Freely slidable on shaft 52 is a bushing 55 which is provided with a cone-shaped end surface 56 at one end and an undercut groove 57 adjacent the other end. Mounted on frame 47 (Figs. 4, 6 and 7) is a shaft 58 to which is secured an operating lever 59. Movement of lever 59 in slot 60 of wall 49 will rotate the shaft in one direction or the other.

Secured to the shaft 58 adjacent to bushing 55 is a crank member 61 having an offset pin 62 which engages the groove 57 of bushing 55. Thus any movement of lever 59 will result in a longitudinal movement of the bushing 55 on shaft 52 through the drive connection between the pin 62 and the groove 57. The pivot assembly 53 includes a cam follower 63 which is held in engagement with cone surface 56 of bushing 55 by a spring 64. As illustrated in Figure 6 the spring 64 is connected by suitable means between the upper end of reflector 51 and a bracket 65 secured to the wall 49 about shaft 52. It should be obvious to one skilled in the art that individual or simultaneous adjustment of lever 59 and knob 54 will result in a free universal adjustment of the light beam direction emission through opening 66 of the casing within the limits of the arc of movement permitted to shaft 52 by the casing and the size of opening 66. These limits are chosen so that the vertical and horzontal sweeps permitted are sufficient for any practical use of a spotlight projector in an auditorium.

In operation the switches 19 and 20 are closed to light the lamp 16 and start the blower 13. Knob 27 is turned to index the disk 28 to a desired light beam opening 36. If sharp beam contrast is not apparent, then the casing door 67 may be opened to gain access to the set screw 45 whereby the focusing lens assembly 44 may be shifted to sharpen the beam. Once the focus of the beam is set for a particular auditorium, the operator need only manipulate the knob 54 and lever 59 to adjust the horizontal and vertical sweeps of the projected spotlight beam. If colored beams are desired, suitable filters (not shown) may be mounted on bracket 68 over opening 66 of the casing. For various purposes it becomes desirable to have a spotlight adaptable to a quick black-out. With this invention the operator need only move the knob 41 to place the plate 42 in the path of the light beam, and the lamp 16 need not be extinguished.

Thus it should be apparent to one skilled in the art that the invention provides a compact, novel improvement in the art of portable spotlight projectors in which several unique structural features coact to render the projector adaptable to any type of auditorium, school or theatre use. It is realized that certain of the structural details of the projector are susceptible to many modifications well within the purview of this inventor who intends to be limited only by the scope of the appended claims.

I claim:

1. A spotlight projector comprising a casing, a compartment formed within the casing at one end thereof, means to direct air into said compartment, said casing being perforated on at least one wall of the compartment to provide an exhaust for the air, an electric lamp mounted within the compartment, means to selectively connect the lamp to a source of power, focusing lens means secured within the casing, said compartment having an opening in one wall to permit light to be directed to the lens means, lens means mounted adjacent said opening to direct light from the lamp to the focusing lens means, adjustable means mounted within the casing between the light directing lens means and the focusing lens means for selectively adjusting the size and contour of the light beam, and adjustable light directing means secured to the opposite end of the casing from the lamp compartment to receive light from the focusing lens means and to direct said light to the exterior of the casing.

2. The invention according to claim 1 wherein a movable light stop is secured to the casing between the said adjustable means and the focusing lens means to render the projector selectively adaptable to a quick light beam cutoff without extinguishing the light source.

3. A spotlight projector comprising a casing, a light compartment formed within the casing at one end thereof, means to direct air into said compartment, said casing being perforated on at least one wall adjacent the compartment to provide an exhaust for the air, an electric lamp mounted within the compartment, means to selectively connect the lamp to a source of power, a focusing lens means mounted within the casing, said compartment having an opening in one wall to permit light to be directed to the focusing lens means, lens means mounted within the casing adjacent said opening to direct a light beam from the lamp to the focusing lens means, a rotatable disk mounted within the casing in the path of the light beam, said disk being provided with a plurality of different light beam sizing and contouring openings, these said openings being changeable by movement of the disk into selective opening registration with the light beam between the directing lens means and the focusing lens means, and adjustable light directing means secured to the opposite end of the casing from the lamp compartment to receive light from the focusing lens means and to direct said light to the exterior of the casing.

4. The invention according to claim 3 wherein a movable light stop is secured to the casing between the said adjustable disk and the focusing lens means to render the projector selectively adaptable to a quick light beam cutoff without extinguishing the lamp.

5. The invention according to claim 3 wherein an indexing means is provided within the casing to fix the alignment of the disk openings in registration with the light beam.

References Cited in the file of this patent

UNITED STATES PATENTS

| | | |
|---|---|---|
| 1,722,975 | Brenkert | July 30, 1929 |
| 1,738,944 | Brenkert | Dec. 10, 1929 |
| 1,907,750 | Jarnette | May 9, 1933 |
| 2,114,963 | Levy | Apr. 19, 1938 |
| 2,558,964 | Kliegl | July 3, 1951 |
| 2,705,278 | Pratt | Mar. 29, 1955 |